United States Patent
Lee

(10) Patent No.: US 9,007,874 B2
(45) Date of Patent: Apr. 14, 2015

(54) SIGNAL GENERATION DEVICE

(75) Inventor: Jae Jun Lee, Seoul (KR)

(73) Assignee: Penandfree Co., Ltd., Seongnam-Si, Gyeonggi-Do (KR)

( * ) Notice: Subject to any disclaimer, the term of this patent is extended or adjusted under 35 U.S.C. 154(b) by 806 days.

(21) Appl. No.: 13/306,389

(22) Filed: Nov. 29, 2011

(65) Prior Publication Data

US 2012/0314543 A1  Dec. 13, 2012

(30) Foreign Application Priority Data

Jun. 7, 2011 (KR) ........................ 10-2011-0054486

(51) Int. Cl.
G01V 1/155 (2006.01)
G06F 3/0354 (2013.01)
G06F 3/043 (2006.01)

(52) U.S. Cl.
CPC ............ *G06F 3/03545* (2013.01); *G06F 3/043* (2013.01)

(58) Field of Classification Search
CPC ...................................................... G01V 1/155
USPC ......... 367/907, 116; 178/18.04, 18.01, 18.09; 345/172, 179–183; 439/67, 77
See application file for complete search history.

(56) References Cited

FOREIGN PATENT DOCUMENTS

| KR | 10-0418423 B1 | 1/2004 |
| KR | 10-0850792 B1 | 7/2008 |

*Primary Examiner* — Isam Alsomiri
*Assistant Examiner* — Amienatta M Ndure Jobe
(74) *Attorney, Agent, or Firm* — Kile Park Reed & Houtteman PLLC

(57) ABSTRACT

Provided is a signal generation device used for an information input method using an ultrasonic signal. Contact electrodes which are formed in a flexible printed circuit board to be in contact with an ultrasonic wave generation unit and reference signal generation units are disposed in a row, so that a length of the flexible printed circuit board can be reduced. Accordingly, in comparison with a signal generation module in the related art, a length of the signal generation module can be reduced, so that the signal generation device can be miniaturized. In addition, in order to maintain the contact between contact electrodes of the flexible printed circuit board and the ultrasonic wave generation unit, the contact electrodes which are in contact with the ultrasonic wave generation unit and the flexible printed circuit board are surrounded by a contact maintaining member which is constructed with a cylindrical elastic member.

14 Claims, 10 Drawing Sheets

(a)

(b)

(a)

(b)

(c)

(a)   (b)

(a)

(b)

(c)

SIGNAL GENERATION DEVICE

BACKGROUND OF THE INVENTION

1. Field of the Present Invention

The present invention relates to a signal generation device, and more particularly, a signal generation device used for an information input system capable of inputting information by using an ultrasonic signal and a reference signal.

2. Description of the Related Art

As information and communication technology has been developed, various types of electronic input means substituting for a keyboard and a mouse in the related art have been contrived. As a representative example, much attention has been paid to a method of tracking a position of a signal generation device by using a time difference between a propagation time of a reference signal propagating at the speed of light and a propagation time of an ultrasonic signal propagating at the speed of sound and inputting position information of the signal generation device.

In the information input method using the reference signal and the ultrasonic signal, two or more ultrasonic wave reception sensors which are separated from each other by a predetermined distance and a reception module where a reference signal reception sensor is disposed are installed.

If the signal generation device simultaneously generates the ultrasonic signal and the reference signal (an infrared ray signal, an RF signal, or the like), the reference signal which propagates at the speed of light is received by the reception module at the same time of the generation, and the ultrasonic signal propagates through the air at the speed of sound to be received by the ultrasonic wave reception sensors which are separated from each other by a predetermined distance.

The reception time of the reference signal can be estimated by the generation time of the ultrasonic signal. The distance between the signal generation device and each of the ultrasonic wave reception sensors can be obtained by multiplying the speed of sound with the time taken for the ultrasonic signal to propagate from the signal generation device to each of the ultrasonic wave reception sensors, and the distance between the ultrasonic wave reception sensors is a value which is defined in advance. Therefore, a position of the ultrasonic signal can be measured by the triangulation method. The method of measuring the position of the signal generation device is described in detail in Korean Patent No. 10-0418423, and thus, the detailed description thereof is omitted.

FIG. 1a is a diagram illustrating a configuration of a conventional signal generation device, and FIG. 1b is a detailed diagram illustrating a signal generation module for generating an ultrasonic signal and a reference signal in a conventional signal generation device.

First, referring to FIG. 1a, the signal generation device includes a housing 120, a signal generation module 130 disposed at the front end of the housing, and a cap portion 110 engaged with the housing to contain the signal generation module.

A power supply unit and a microprocessor are built in the housing 120. The power supply unit and the microprocessor is electrically connected to a flexible printed circuit board 133 included in the signal generation module to supply power and control signals to the signal generation module 130.

The cap portion 110 in engagement with the housing protects the signal generation module 130. The ultrasonic signal and the reference signal are emitted in the air through an emission openings 112 formed on the cap portion 110.

The signal generation module 130 generates a reference signal and an ultrasonic signal. Referring to FIG. 1b, the signal generation module 130 includes a spool 132, a flexible printed circuit board 133, a reference signal generation unit 136, an ultrasonic wave generation unit 131, and a contact maintaining member 134.

An electrode pattern is formed on the flexible printed circuit board 133, and the reference signal generation unit 136 is disposed so as to be connected to the electrode pattern. A pair of contact electrodes 137 is formed to be connected to the ultrasonic wave generation unit 131 to supply power to the ultrasonic wave generation unit 131. The reference signal generation unit 136 may be implemented with a pair of LED lamps generating infrared rays. The flexible printed circuit board 133 is engaged with the spool 132 so as to surround the spool 132.

On the other hand, the ultrasonic wave generation unit 131 includes a piezo film 131-1 and conducting points 131-2 formed on the two surfaces of the piezo film to supply a voltage to the piezo film 131-1. As illustrated in FIGS. 1a and 1b, the conducting points are in contact with the respective contact electrodes 137 of the flexible printed circuit board. In addition, the ultrasonic wave generation unit is engaged with the spool so as to surround the spool.

On the other hand, the contact maintaining member 134 exerts pressure on the contact electrodes in the state where the conducting points 131-2 of the ultrasonic wave generation unit are in contact with the contact electrodes 137 so that the contact state between the conducting points 131-2 formed on the two surfaces of the piezo film and a pair of the contact electrodes 137 formed in the flexible printed circuit board are maintained. The contact maintaining member 134 is constructed with a material having good compressibility and restitution elasticity. The contact maintaining member 134 is engaged with the spool 132 by screw engagement through a central engagement hole 134-1. In the process of combining with the spool 132, the contact maintaining member 134 exerts pressure on the contact electrodes by pressure applying portions 134-2 of the two ends of the contact maintaining member 134.

Recently, electronic apparatuses tend to be configured to have small sizes, and the signal generation device also needs to be miniaturized so as to be used for portable electronic apparatuses. However, the aforementioned conventional signal generation device has a difficulty in the miniaturization thereof.

In the conventional signal generation device, in order to connect the ultrasonic wave generation unit 131 to the flexible printed circuit board 133 without influence on the reference signal generation unit 136, the contact maintaining member 134 described above is used. The contact maintaining member 134 needs to has a certain length so as to include an engagement hole 134-1 through which a screw for screw engagement with the spool 132 passes and two-end pressure applying portions 134-2 for applying pressure to a pair of the contact electrodes. In addition, with respect to the position of the reference signal generation unit 136, the reference signal generation unit 136 is disposed to be separated by a certain distance from the contact maintaining member 134 so as to be capable of 360-degree radiation and so as not to interfere with contact maintaining member 134. Therefore, the length of the reference signal generation unit 136 cannot be reduced.

Therefore, there is a physical limitation in reducing the size of the signal generation module.

SUMMARY OF THE INVENTION

The present invention is to provide a signal generation device which is miniaturized by reducing a length and thickness thereof.

According to an aspect of the present invention, there is provided is a signal generation device including: a spool; a flexible printed circuit board which surrounds the spool; a reference signal generation unit which is disposed on the flexible printed circuit board to generate a reference signal; and an ultrasonic wave generation unit which surrounds the spool and is in contact with a contact electrode formed on the flexible printed circuit board to be supplied with power to generate an ultrasonic signal, wherein the contact electrode is formed in an area having the same height as that of the reference signal generation unit.

In addition, the flexible printed circuit board may include a main portion which surrounds the spool and a sub portion which is extended from the main portion in a vertical direction, and the contact electrode may be formed in an area of the main portion where the main portion and the sub portion are connected.

In addition, the number of the contact electrodes may correspond to the number of conducting points formed in the ultrasonic wave generation unit.

In addition, the contact electrodes may be configured as a pair; the reference signal generation units may be configured as a pair; and a pair of the contact electrodes may be disposed between a pair of light-emitting lamps.

In addition, the ultrasonic wave generation unit may include a piezo film and a pair of conducting points formed on two surfaces of the piezo film, and the conducting points may be in contact with the respective contact electrodes.

In addition, the signal generation device may further include a contact maintaining member which maintains a contact state between the ultrasonic wave generation unit and the contact electrode by surrounding the flexible printed circuit board in the state where the flexible printed circuit board surrounds the spool and the ultrasonic wave generation unit is in contact with the contact electrode.

In addition, the contact maintaining member may be a cylindrical elastic member.

In addition, the contact maintaining member may be constructed with a transparent material which is capable of transmitting light generated by the reference signal generation unit.

In addition, the reference signal generation unit may be constructed with a light-emitting lamp which generates infrared rays, and an opening window may be formed at a position corresponding to the light-emitting lamp so that the light-emitting lamp is exposed to an outer portion of the contact maintaining member.

In addition, the opening window may be configured to have a tapered shape in the periphery of the light-emitting lamp so that the infrared rays generated by the light-emitting lamp are not blocked by the elastic member.

In addition, a cross section of an area of the spool which is surrounded by the flexible printed circuit board may be formed to have a portion where the reference signal generation unit of the flexible printed circuit board is to be disposed by removing a portion of a circle.

In addition, a penetration hole which a pen core portion penetrates may be formed in the spool.

In addition, a cross section of an area of the spool which is surrounded by the flexible printed circuit board may include first and second surfaces which are parallel to each other and third and fourth curved surfaces which connect the first and second surfaces, respectively.

In addition, a penetration hole which a pen core portion penetrates may be formed in the supporting member.

In addition, the signal generation device may further include a cap portion which is engaged with the housing of the signal generation device so that a signal generation module including the spool, the flexible printed circuit board, the reference signal generation unit, and the ultrasonic wave generation unit is contained therein, and the ultrasonic signal generated by the ultrasonic wave generation unit may propagate through a space between the signal generation module and the cap portion downwards (in the direction toward a handwriting surface) to be emitted in the air.

According to the present invention, the contact electrodes which are formed in the flexible printed circuit board to be in contact with the ultrasonic wave generation unit and the reference signal generation units are disposed in a row, so that a length of the flexible printed circuit board can be reduced. Accordingly, in comparison with a signal generation module in the related art, a length of the signal generation module can be reduced, so that the signal generation device can be miniaturized.

In addition, according to the present invention, in order to maintain the contact between the contact electrodes of the flexible printed circuit board and the ultrasonic wave generation unit, the contact electrodes which are in contact with the ultrasonic wave generation unit and the flexible printed circuit board are surrounded by a contact maintaining member which is constructed with a cylindrical elastic member. Therefore, the contact state can be maintained without use of a contact maintaining member in the related art which has a certain length in the longitudinal direction.

In addition, with respect to the spool according to the present invention, in the process for allowing the flexible printed circuit board to surround the spool, a portion of the area corresponding to the reference signal generation unit disposed in the flexible printed circuit board is cut, so that an increase in total diameter of the signal generation module is prevented even after the flexible printed circuit board surrounds the spool. Accordingly, in comparison with the related art, the thickness of the signal generation module and the thickness of the signal generation device are reduced, so that the signal generation device can be miniaturized.

DESCRIPTION OF THE PREFERRED EMBODIMENTS

Figure 1A:
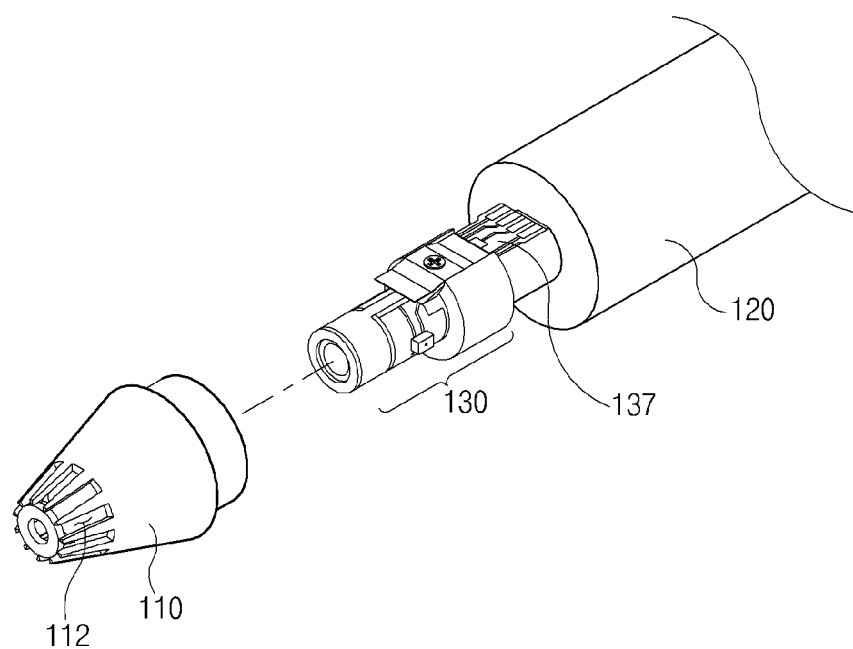
FIG. 1a is a diagram illustrating a configuration of a conventional signal generation device.

Hereinafter, embodiments of the present invention will be described with reference to the accompanying drawings. The elements having the same functions may be denoted by the same reference numerals.

Figure 2A:
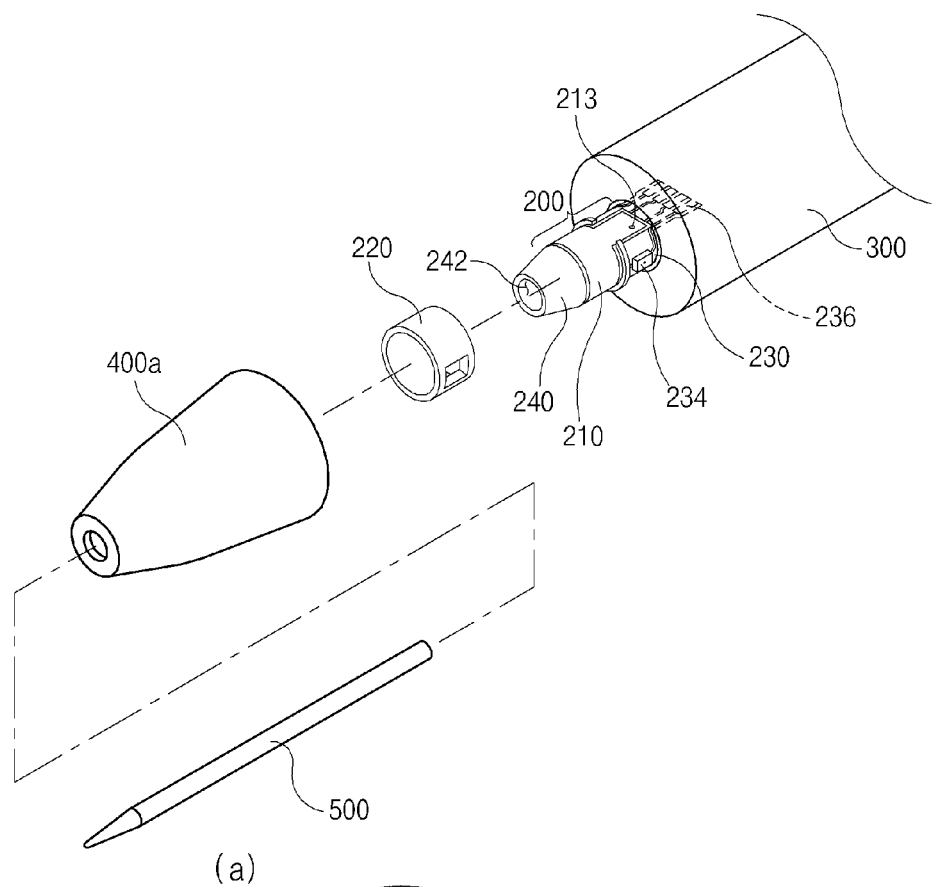
FIG. 2a is a diagram illustrating a configuration of a signal generation device according to an embodiment of the present invention.
Figure 2A:
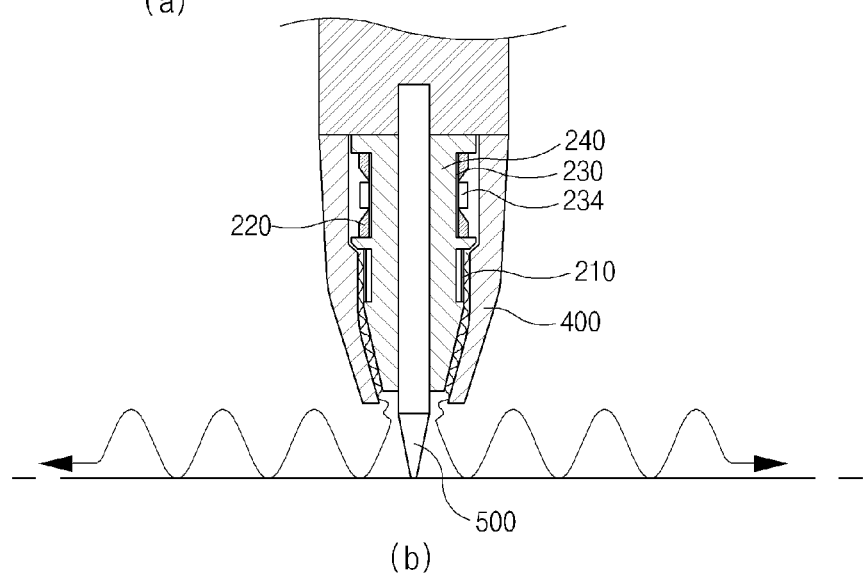
Figure 2B:
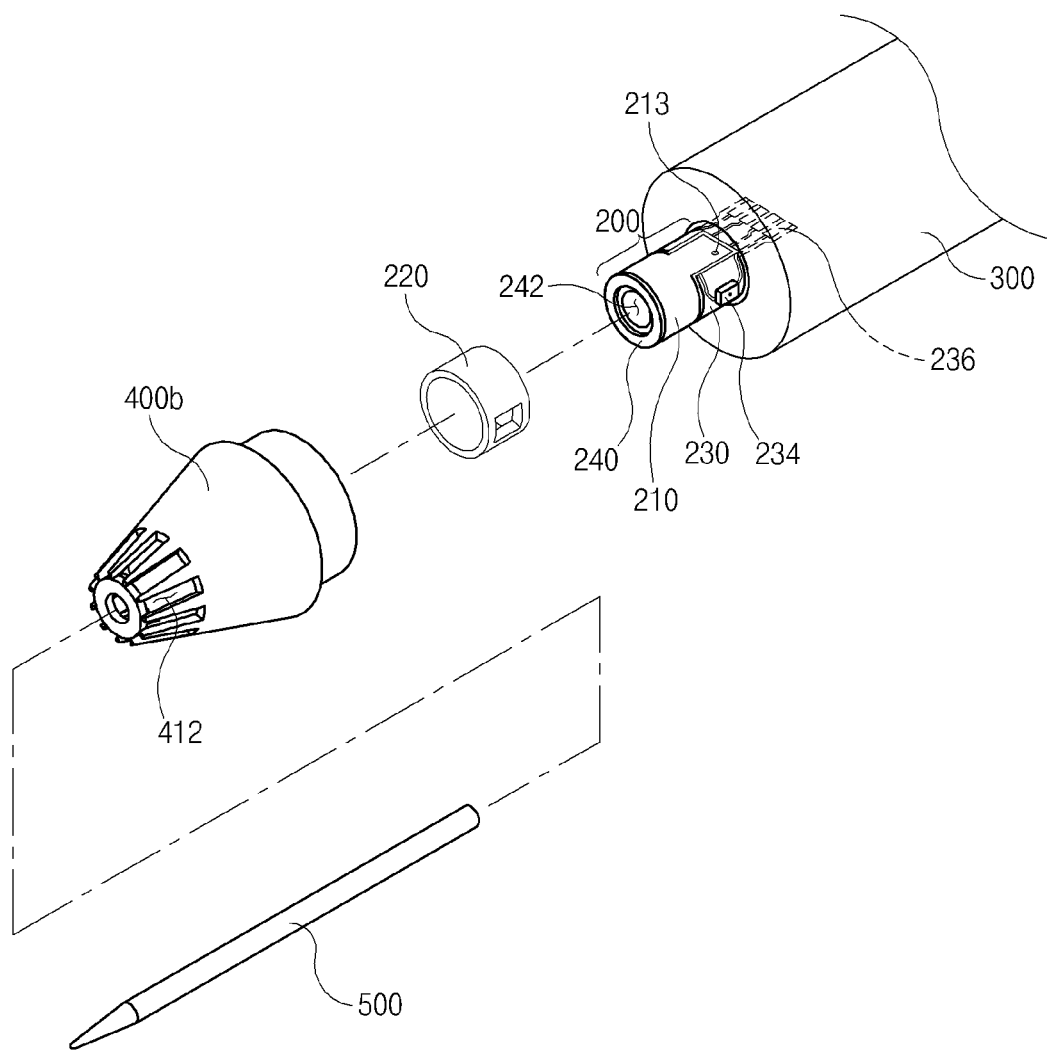
FIG. 2b is a diagram illustrating a configuration of a signal generation device according to another embodiment of the present invention.

FIG. 2a is a diagram illustrating a configuration of the signal generation device according to an embodiment of the present invention, and FIG. 2b is a diagram illustrating a configuration of the signal generation device according to another embodiment of the present invention.

First, referring to FIG. 2a, similarly to a conventional signal generation device, the signal generation device according to the embodiment of the present invention mainly includes a housing 300 containing a power supply unit and a microcontroller, a signal generation module 200 disposed at the front end of the housing 300 to generate a reference signal and an ultrasonic signal, and a cap portion 400a engaged with the housing 300 to containing the signal generation module 200. In addition, the signal generation device may further include a pen core portion 500 configured to penetrate the cap portion 400a and the signal generation module 200 to be contained in the housing 300.

In the example illustrated in FIG. 2a, the cap portion 400a contains the signal generation module 200 and is engaged with the housing 300, and unlike the conventional cap portion, the emission openings are not formed on the cap portion 400a, so that the ultrasonic signal generated by the signal generation module 200 is emitted only in the direction toward a handwriting surface. In this case, the ultrasonic signal generated by an ultrasonic wave generation unit 210 is propagated through a space between the cap portion 400a and the signal generation module 200 in the downward direction (direction toward a handwriting surface) and, after that, is emitted to an external portion through a space between the cap portion 400a and the pen core portion 500 (refer to (b) of FIG. 2a). Therefore, since the ultrasonic signal is emitted in the air within a very short distance from the center of the pen core portion 500, a user can input an accurate position irrespective of the inclination direction of the signal generation device in the state where the pen core portion 500 is in contact with the handwriting surface.

On the other hand, referring to FIG. 2b, in the example illustrated in FIG. 2b, the cap portion 400b contains the signal generation module 200 and is engaged with the housing 300, and similarly the conventional cap portion, emission openings 412 are formed in the area corresponding to the ultrasonic wave generation unit 210, so that the ultrasonic signal generated by the signal generation module 200 can be directly emitted in the air.

Since the configuration of the housing 300 and the configuration of the power supply unit, the microcontroller, and the like contained in the housing 300 are similar to those of the conventional signal generation device, the description thereof is omitted. Hereinafter, the configuration of the signal generation module 200 as a feature of the present invention will be mainly described.

The signal generation module 200 according to the present invention includes a spool 240 where a penetration hole 242 which the pen core portion 500 penetrates to be contained in is formed, a flexible printed circuit board 230 where an electrode pattern is formed and a reference signal generation unit 234 is disposed, an ultrasonic wave generation unit 210 which generates an ultrasonic signal, and a contact maintaining member 220 which electrically connects the ultrasonic wave generation unit 210 to the flexible printed circuit board 230. Hereinafter, the components will be described.

Figure 3:
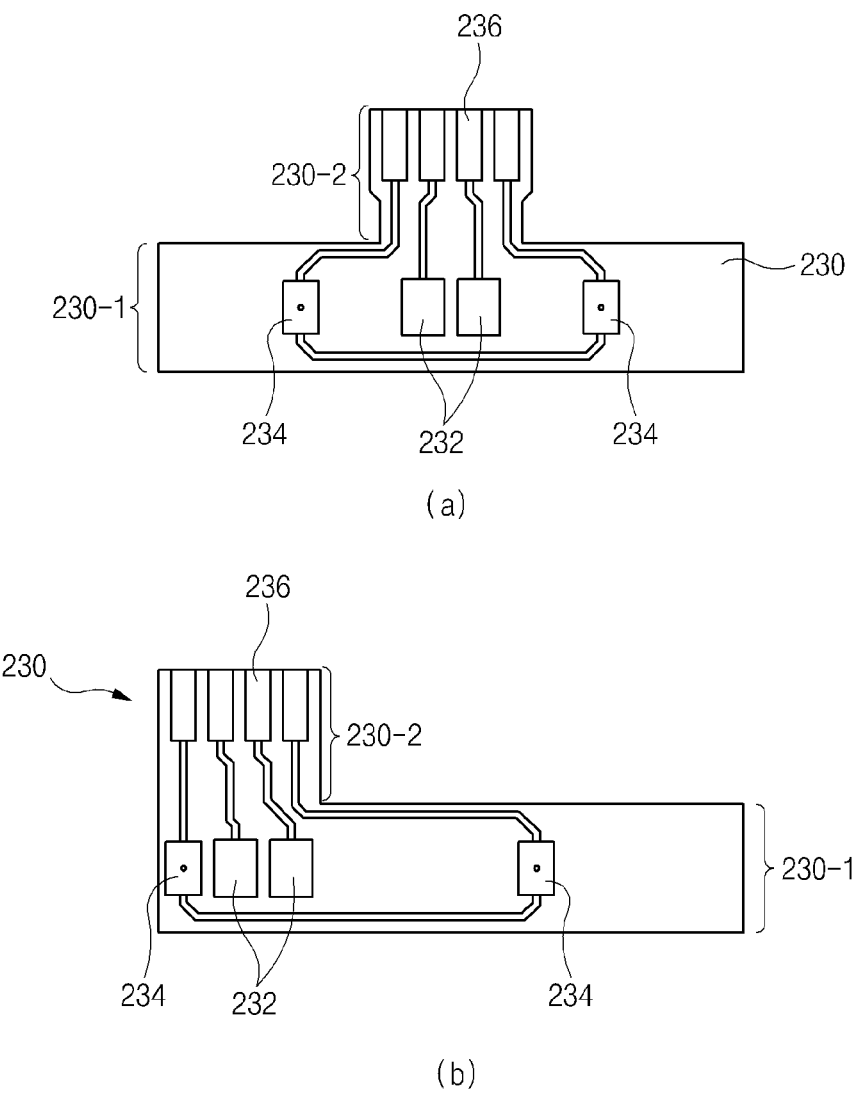
FIG. 3 is a diagram illustrating a configuration of a flexible printed circuit board according to the embodiment of the present invention.

FIG. 3 is a diagram illustrating a configuration of the flexible printed circuit board 230 according to the embodiment of the present invention. Referring to FIG. 3, the flexible printed circuit board 230 according to the embodiment of the present invention includes a main portion 230-1 which surrounds the spool 240 and a sub portion 230-2 which is extended from the main portion 230-1 in the vertical direction. In the sub portion 230-2, connection electrodes 236 are disposed to connect electrode patterns formed on the main portion 230-1 to the power supply unit and the microprocessor.

The main portion 230-1, a pair of reference signal generation units 234 and a pair of contact electrodes 232 connected to the ultrasonic wave generation unit 210 are disposed in parallel in areas having the same height from the bottom side of the main portion 230-1 as a reference level. The connection electrodes 236 formed in the sub portion 230-2 are electrically connected through the electrode patterns to a pair of the contact electrodes 232 and a pair of the reference signal generation units 234.

In the example illustrated in FIG. 2, although the reference signal generation unit 234s and the ultrasonic wave generation unit 210 are disposed accurately in a row, the heights of the reference signal generation units 234 and the height of the ultrasonic wave generation unit 210 may be changed according to design specifications if the reference signal generation units 234 are located within the main portion 230-1. In addition, the reference signal generation units 234 may be implemented with a light-emitting lamp (LED lamp). It is preferable that a pair of the contact electrodes 232 are formed in an area of the main portion 230-1 which is connected to the sub portion 230-2 so that the contact electrodes 232 can be easily connected to the connection electrodes 236. In other words, in the case where the sub portion 230-2 is connected to the center of the main portion 230-1, a pair of the contact electrodes 232 are preferably disposed in the central area of the main portion 230-1 (refer to (a) of FIG. 3), and in the case where the sub portion 230-2 is connected to the one end of the main portion 230-1, a pair of the contact electrodes 232 are preferably disposed in an area at the corresponding one end of the main portion 230-1 (refer to (b) of FIG. 3).

Figure 1B:
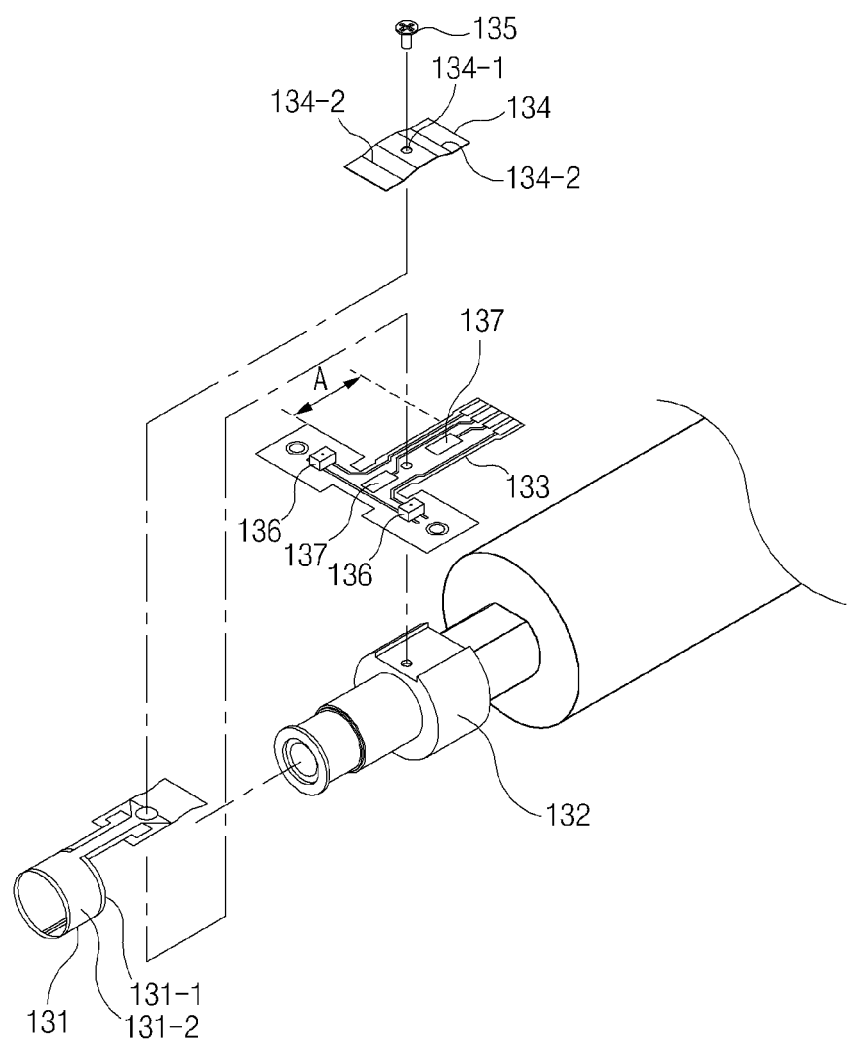
FIG. 1b is a detailed diagram illustrating a signal generation module for generating an ultrasonic signal and a reference signal in a conventional signal generation device.

According to the present invention, the contact electrodes 232 and the reference signal generation units 234 are disposed in a row, so that it is possible to reduce the length of the signal generation module 200 by the distance between the contact electrodes 137 (refer to A of FIG. 1b) for contact with the ultrasonic wave generation unit in comparison with the conventional technique.

Figure 8:
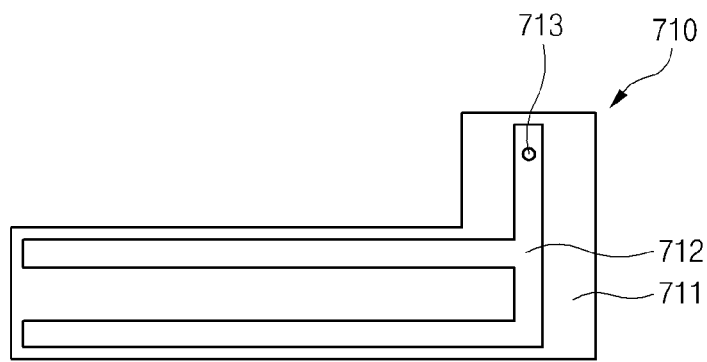
FIG. 8 is a diagram illustrating a configuration of the ultrasonic wave generation unit which is implemented with a piezo film according to another embodiment of the present invention, wherein (a) of FIG. 8 illustrates an outer surface of the ultrasonic wave generation unit which is not in contact with the spool, (b) of FIG. 8 illustrates an inner surface of the ultrasonic wave generation unit which is in contact with the spool, and (c) of FIG. 8 illustrates a state where the two ends of the piezo film are adhered to each other.
Figure 8:
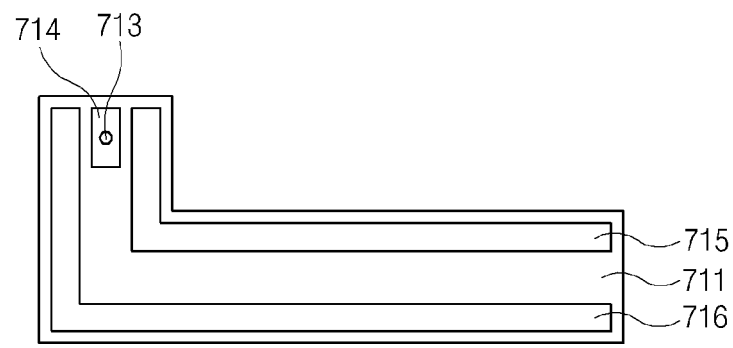
Figure 8:
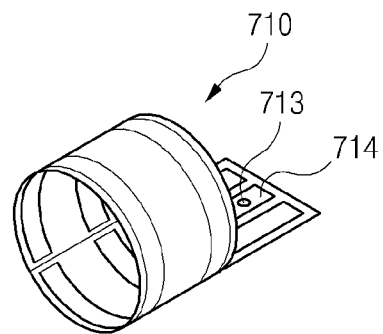

In addition, in the embodiment of the present invention illustrated in FIG. 2, although a pair of the contact electrodes 232 are formed in the flexible printed circuit board 230, three or more contact electrodes may also be formed on the flexible printed circuit board 230 according to the number of the conducting points which are formed on the piezo film constituting the ultrasonic wave generation unit 210 (a plurality of the conducting points may also be formed on one surface of the piezo film) as illustrated in FIG. 8 described later. Although the contact electrodes 232 are preferably formed in the central area of the main portion 230-1, the positions of the contact electrodes 232 may be changed according to design conditions.

Figure 4:
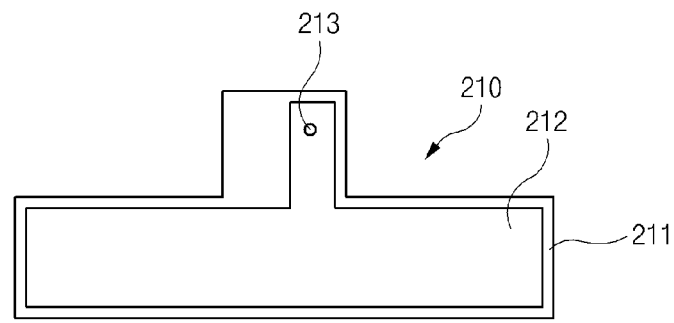
FIG. 4 is a diagram illustrating a configuration of an ultrasonic wave generation unit which is implemented with a piezo film according to the embodiment of the present invention, wherein (a) of FIG. 4 illustrates an outer surface of the ultrasonic wave generation unit which is not in contact with a spool, (b) of FIG. 4 illustrates an inner surface of the ultrasonic wave generation unit which is in contact with the spool, and (c) of FIG. 4 illustrates a state where two ends of the piezo film are adhered to each other.
Figure 4:
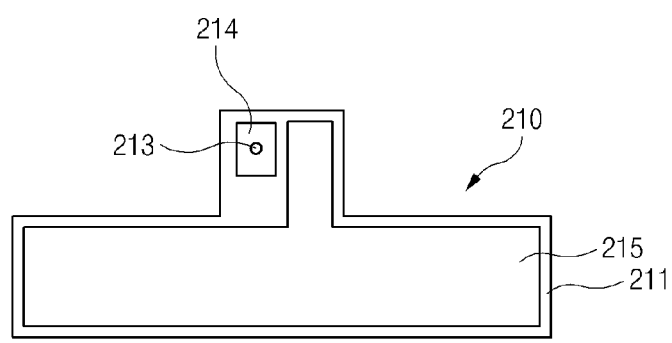
Figure 4:
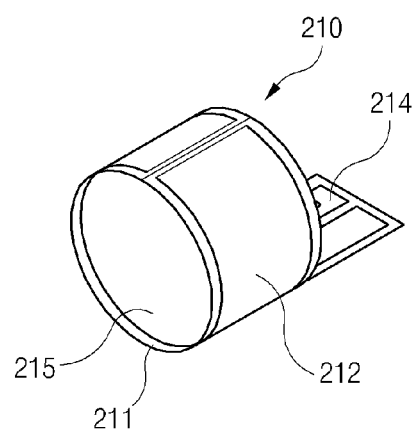

FIG. 4 is a diagram illustrating a configuration of the ultrasonic wave generation unit 210 which is implemented with the piezo film 211 according to the embodiment of the present invention, wherein (a) of FIG. 4 illustrates an outer surface of the ultrasonic wave generation unit 210 which is not in contact with the spool 240, (b) of FIG. 4 illustrates an inner surface of the ultrasonic wave generation unit 210 which is in contact with the spool 240, and (c) of FIG. 4 illustrates a state where two ends of the piezo film 211 are adhered to each other.

Referring to (a) to (c) of FIG. 4, the ultrasonic wave generation unit 210 according to the present invention is configured by forming the conducting points 212 and 215 on the two surfaces of the piezo film 211. The piezo film 211 is formed longitudinally in the length direction, and a protrusion portion for contact with the contact electrode 232 formed in the flexible printed circuit board 230 is formed in the central area thereof. The two ends of the piezo film 211 are adhered to each other to surround the spool 240.

On the other hand, a via-hole 213 is formed at one side of the protrusion portion. The via-hole 213 is provided so as to allow the conducting point 212 formed on the outer surface to be in contact with the contact electrode 232 formed in the flexible printed circuit board 230 through the inner surface. As illustrated in (b) of FIG. 4, a predetermined area of the inner surface of the protrusion portion is isolated from the conducting point 215 formed on the inner surface, and the isolated area (contact area 214) is connected to the conducting point 212 formed on the outer surface through a conductive material formed in the cross section of the via-hole 213, so that power supplied through the contact electrode 232 is transferred to the conducting point 212 formed on the outer surface.

Figure 5:
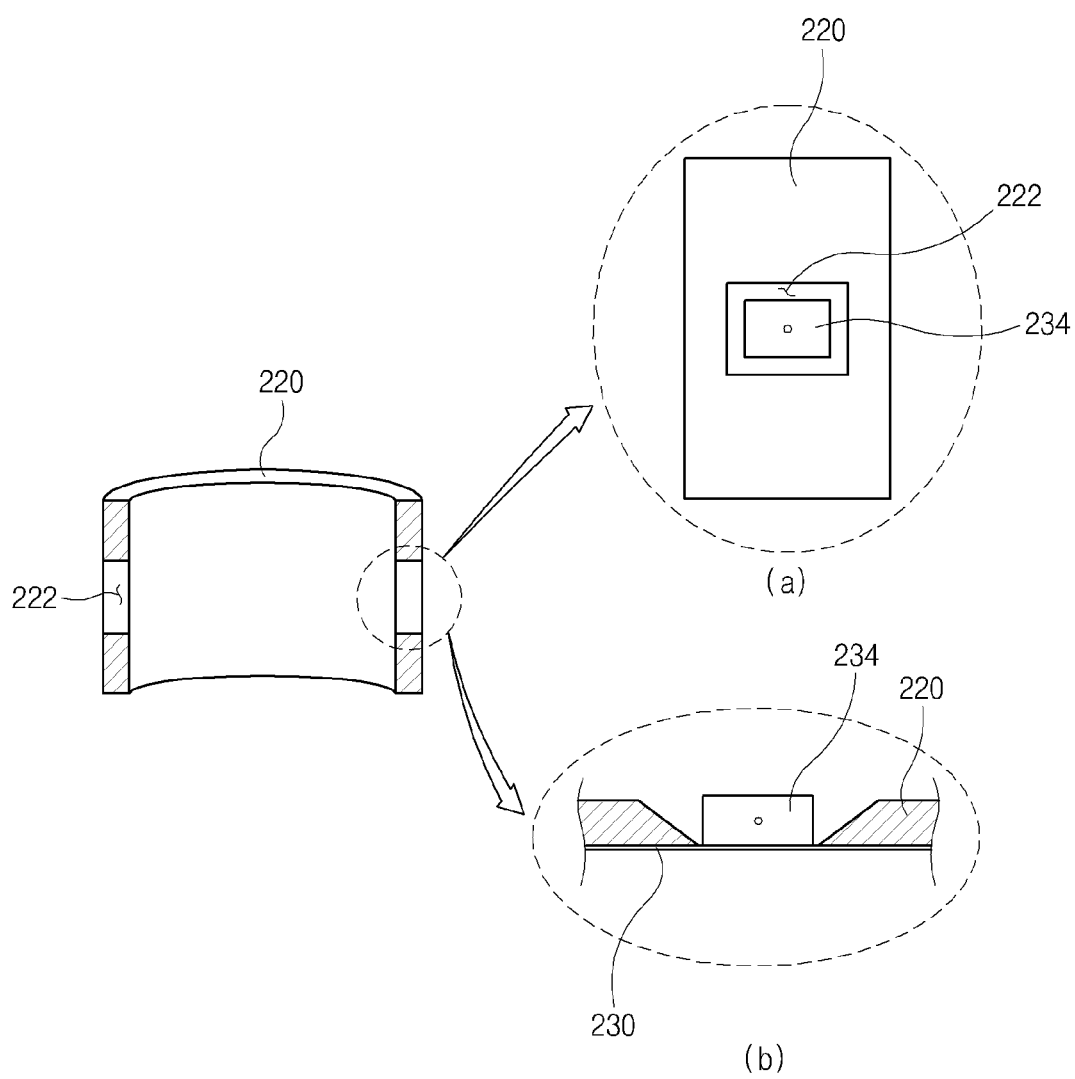
FIG. 5 is a diagram illustrating a contact maintaining member according to the embodiment of the present invention.

FIG. 5 is a diagram illustrating the contact maintaining member 220 according to the embodiment of the present invention. Unlike the conventional contact maintaining member 134 which is constructed with a material having a good compressibility and restitution elasticity and screw-coupled with the spool 132, the contact maintaining member 220 according to the present invention is constructed with a cylindrical elastic member such as a rubber or a silicon material.

In addition, opening windows 222 are formed in the cylindrical surface to penetrate the outer circumferential surface and the inner circumferential surface. As described later, the opening windows 222 are provided so that, when the contact maintaining member 220 is configured to surround the flexible printed circuit board 230 and the ultrasonic wave generation unit 210, the reference signal generation units 234 disposed in the flexible printed circuit board 230 are exposed to external portions of the contact maintaining member 220.

Therefore, the opening windows 222 are formed in the positions corresponding to the reference signal generation units 234 of the flexible printed circuit board 230. Particularly, in the case where the reference signal generation unit 234 is an LED lamp which generates infrared rays, the opening window 222 may be formed to have a size larger than that of the LED lamp (refer to (a) of FIG. 5) so that light generated and emitted from the LED lamp is not blocked by the contact maintaining member 220. In addition, the peripheral area of the opening window 222 of the contact maintaining member 220 may be configured to have a tapered shape so that the thickness of the elastic member be gradually decreased as it goes toward the LED lamp (refer to (b) of FIG. 5). In addition, the contact maintaining member 220 according to the present invention is preferably constructed with a transparent material so as to transmit light generated from the LED lamp.

Figure 6:
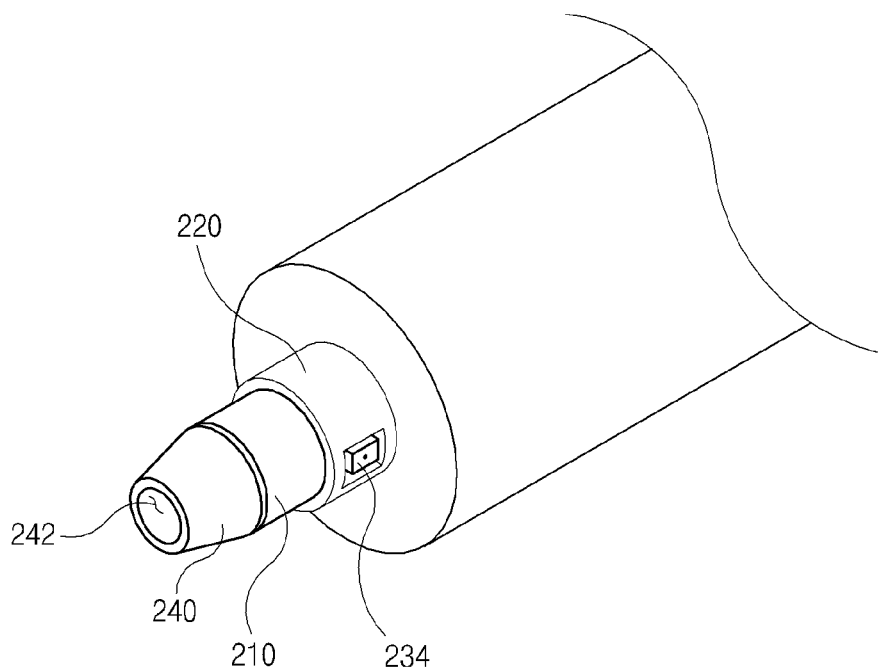
FIG. 6 is a diagram illustrating an example where the signal generation module according to the present invention is engaged.

FIG. 6 is a diagram illustrating an example where the signal generation module 200 according to the present invention is engaged.

Referring to FIGS. 2 and 6, an upper portion of the spool 240 is surrounded by the flexible printed circuit board 230, and a lower portion of the spool 240 is surrounded by the piezo film 211 constituting the ultrasonic wave generation unit 210. The contact area 214 formed in the protrusion portion of the ultrasonic wave generation unit 210 becomes in contact with the contact electrode 232 of the flexible printed circuit board 230, and after that, the flexible printed circuit board 230 and the protrusion portion of the ultrasonic wave generation unit 210 are covered with the contact maintaining member 220 which is constructed with an elastic member, so that the state where the contact area 214 of the ultrasonic wave generation unit 210 is in contact with the contact electrode 232 of the flexible printed circuit board 230 is maintained. At this time, as described above, the reference signal generation units 234 disposed in the flexible printed circuit board 230 are exposed to external portions through the opening window 222 of the contact maintaining member 220.

Due to the configuration of the signal generation module 200, it is possible to remarkably reduce the length of the signal generation module in comparison with the signal generation module 200 of the conventional signal generation device.

Figure 7:
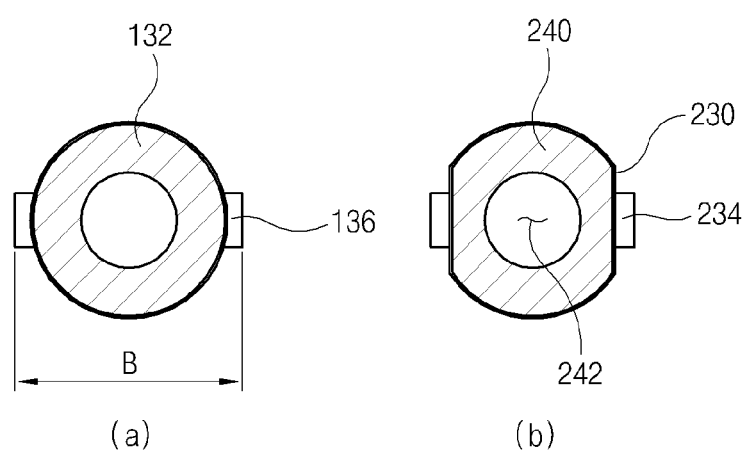
FIG. 7 is a diagram illustrating a cross section of the spool according to the embodiment of the present invention.

On the other hand, according to the embodiment of the present invention, as illustrated in (b) of FIG. 7, in order to reduce the diameter of the signal generation module 200 as well as the length of the signal generation module 200, the diameter is reduced by removing a portion of the area of the spool 240 which is surrounded by the flexible printed circuit board 230.

As illustrated in (a) of FIG. 6, the cross section of the conventional spool 132 has a shape of a circle having a constant radius. In this case, when the spool 132 is surrounded by the flexible printed circuit board 133 where the LED lamp is disposed, the diameter (B) of the signal generation module is increased by the height of the LED lamp, so that there is a problem in that the total diameter of the signal generation device is increased.

Therefore, in the embodiment of the present invention, as illustrated in (b) of FIG. 7, a portion of the area corresponding to the position of the flexible printed circuit board 230 where the LED lamp is disposed is cut from the spool 240 of which the cross section has a shape of a circle in parallel to the line segment passing through the center of the circle, so that it is possible to prevent the diameter from being increased after the spool 240 is surrounded by the flexible printed circuit board 230.

The shape of the cross section of the spool 240 is described again. The cross section of the area of the spool 240 which is surrounded by the flexible printed circuit board 230 includes first and second surfaces which are parallel to each other and third and fourth curved surfaces which connect the first and second surfaces, respectively.

In this manner, the increase in diameter is prevented, so that it is possible to decrease the diameter of the signal generation module 200 and the total size of the signal generation device in comparison with the conventional technique.

In the embodiment of the present invention described hereinbefore, the conducting points 212 and 215 are formed on the respective surfaces of the piezo film 211 constituting the ultrasonic wave generation unit 210, and a pair of the contact electrodes 232 for supplying power to the conducting points 212 and 215 are formed on the flexible printed circuit board 230. However, two or more conducting points may be formed on one surface of the piezo film 211, and the contact electrodes of which the number corresponds to the number of the conducting points may be formed on the flexible printed circuit board 230.

FIG. 8 is a diagram illustrating a configuration of the ultrasonic wave generation unit 210 which is implemented with the piezo film 211 according to another embodiment of the present invention, wherein (a) of FIG. 8 illustrates the outer surface of the ultrasonic wave generation unit 210 which is not in contact with the spool 240, (b) of FIG. 8 illustrates the inner surface of the ultrasonic wave generation unit 210 which is in contact with the spool 240, and (c) of FIG. 8 illustrates a state where the two ends of the piezo film 211 are adhered to each other.

In the example illustrated in (a) to (c) of FIG. 8, one conducting point 712 is formed on the outer surface of the piezo film 711, and two conducting points 715 and 716 are formed on the inner surface of the piezo film 711. The protrusion portion for forming the contact area 714 is formed at the one end of the piezo film 711. The conducting point 712 formed on the outer surface of the piezo film 711 is connected through the via-hole 713 to the contact area 714 formed on the inner surface of the protrusion portion. The two conducting points 715 and 716 formed on the inner surface of the piezo film 711 are extended to the protrusion portion to be in contacted with the contact electrode.

The ultrasonic wave generation unit 710 generates ultrasonic signals with a time interval, so that an amplified ultrasonic signal can be obtained. In other words, in the state where power is continually applied to the conducting point 712 formed on the outer surface, an ultrasonic wave is generated from the area where the first conducting point 715 is formed by applying power to the first conducting point 715 formed on the inner surface. At the timing when the generated ultrasonic wave is propagated into the second conducting point 716 formed on the inner surface, another ultrasonic wave is generated from the area where the second conducting point 716 is formed by applying power to the second conducting point 716. The ultrasonic wave generated from the second conducting point 716 is allowed to overlap the ultrasonic signal generated from the first conducting point 715, so that the amplified ultrasonic signal can be obtained. This method of amplifying the ultrasonic signal is described in detail in Korean Patent No. 10-0850792, and thus, the detailed description thereof is omitted.

Figure 9:
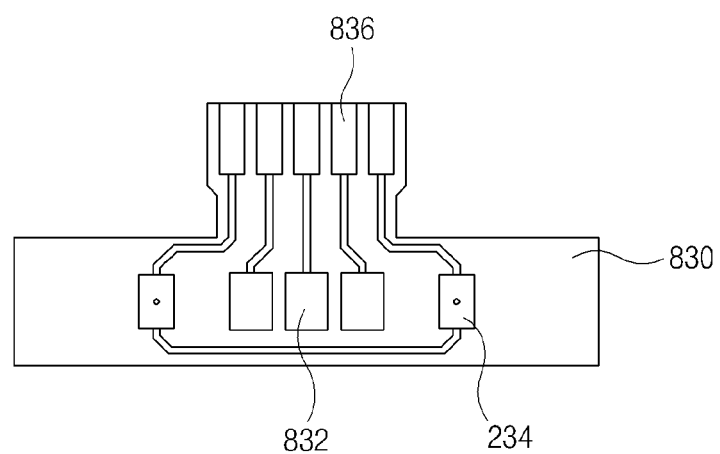
FIG. 9 is a diagram illustrating a configuration of the flexible printed circuit board which supplies power to the ultrasonic wave generation unit illustrated in FIG. 8.

FIG. 9 is a diagram illustrating a configuration of a flexible printed circuit board 830 which supplies power to the ultrasonic wave generation unit 210 illustrated in FIG. 8. In an example illustrated in FIG. 9, three contact electrodes 832 of which the number corresponds to the number of contact areas of an ultrasonic wave generation unit 710 are disposed between the reference signal generation units 234. The positions at which the contact electrodes 832 are disposed are the same as those described above with reference to (a) and (b) of FIG. 3.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A signal generation device comprising:
a spool;
a flexible printed circuit board which surrounds the spool;
a reference signal generation unit which is disposed on the flexible printed circuit board to generate a reference signal;
an ultrasonic wave generation unit which surrounds the spool and is in contact with a contact electrode formed on the flexible printed circuit board to be supplied with power to generate an ultrasonic signal, wherein the contact electrode is formed in an area having the same height as that of the reference signal generation unit;
wherein the flexible printed circuit board includes a main portion which surrounds the spool and a sub portion which is extended from the main portion in a vertical direction; and
wherein the contact electrode is formed in an area of the main portion where the main portion and the sub portion are connected.

2. The signal generation device according to claim 1, wherein the number of the contact electrodes corresponds to the number of conducting points formed in the ultrasonic wave generation unit.

3. The signal generation device according to claim 2, wherein the contact electrodes are configured as a pair; the reference signal generation units are configured as a pair; and a pair of the contact electrodes are disposed between a pair of light-emitting lamps.

4. The signal generation device according to claim 3, wherein the ultrasonic wave generation unit includes a piezo film and a pair of conducting points formed on two surfaces of the piezo film, and the conducting points are in contact with the respective contact electrodes.

5. The signal generation device according to claim 1, further comprising a contact maintaining member which maintains a contact state between the ultrasonic wave generation unit and the contact electrode by surrounding the flexible printed circuit board in the state where the flexible printed circuit board surrounds the spool and the ultrasonic wave generation unit is in contact with the contact electrode.

6. The signal generation device according to claim 5, wherein the contact maintaining member is a cylindrical elastic member.

7. The signal generation device according to claim 6, wherein the contact maintaining member is constructed with a transparent material which is capable of transmitting light generated by the reference signal generation unit.

8. The signal generation device according to claim 6, wherein the reference signal generation unit is constructed with a light-emitting lamp which generates infrared rays, and wherein an opening window is formed at a position corresponding to the light-emitting lamp so that the light-emitting lamp is exposed to an outer portion of the contact maintaining member.

9. The signal generation device according to claim 8, wherein the opening window is configured to have a tapered shape in the periphery of the light-emitting lamp so that the infrared rays generated by the light-emitting lamp are not blocked by the elastic member.

10. The signal generation device according to claim 1, wherein a cross section of an area of the spool which is surrounded by the flexible printed circuit board is formed to have a portion where the reference signal generation unit of the flexible printed circuit board is to be disposed by removing a portion of a circle.

11. The signal generation device according to claim 10, wherein a penetration hole which a pen core portion penetrates is formed in the spool.

12. The signal generation device according to claim 1, wherein a cross section of an area of the spool which is surrounded by the flexible printed circuit board includes first and second surfaces which are parallel to each other and third and fourth curved surfaces which connect the first and second surfaces, respectively.

13. The signal generation device according to claim 12, wherein a penetration hole which a pen core portion penetrates is formed in the spool.

14. The signal generation device according to claim 1,
wherein the signal generation device further comprises a cap portion which is engaged with the housing of the signal generation device so that a signal generation module including the spool, the flexible printed circuit board, the reference signal generation unit, and the ultrasonic wave generation unit is contained therein, and
wherein the ultrasonic signal generated by the ultrasonic wave generation unit propagates through a space between the signal generation module and the cap portion downwards (in the direction toward a handwriting surface) to be emitted in the air.

* * * * *